United States Patent

[11] 3,631,420

[72] Inventor Gerald K. Strehl
Detroit, Mich.
[21] Appl. No. 28,673
[22] Filed Apr. 15, 1970
[45] Patented Dec. 28, 1971
[73] Assignee Information Data Systems, Inc.
Detroit, Mich.

[54] READOUT CIRCUIT FOR DIGITAL MAGNETIC RECORDING SYSTEM
15 Claims, 4 Drawing Figs.

[52] U.S. Cl. .......... 340/174.1
[51] Int. Cl. .......... G11b 5/02
[50] Field of Search .......... 178/66; 340/174.1 G, 174.1 H; 333/70 R

[56] References Cited
UNITED STATES PATENTS
3,516,066 6/1970 Jacoby .......... 340/174.1 H
1,931,664 10/1933 Lavoie .......... 333/70 R

*Primary Examiner*—Robert L. Griffin
*Assistant Examiner*—Barry Leibowitz
*Attorney*—Barnes, Kisselle, Raisch & Choate

ABSTRACT: A readout circuit for phase-modulated data recorded on magnetic storage media wherein the playback signal developed by the playback heads is processed through a passive circuit comprising a resistor connected in series between the head and the primary of a ferrite core transformer. A capacitor is connected in parallel with the secondary of the transformer. The resistor has a value such that the series combination of the resistor and the primary differentiate the pickup signal. The capacitor has a value that tunes the secondary to parallel resonance at a preset frequency to compensate for distortion due to the crowding effect at high-recording densities.

INVENTOR

GERALD K. STREHL

BY Barnes, Kisselle, Raisch & Choate

ATTORNEYS

READOUT CIRCUIT FOR DIGITAL MAGNETIC RECORDING SYSTEM

Digital information is commonly recorded on continuous magnetic surfaces such as a disc, a drum or magnetic tape using frequency modulation, phase modulation, other double frequency techniques and similar multiple-frequency techniques. With these recording techniques, the playback signal has a desirable handwidth but includes at least a double-frequency component which, at higher recording densities, makes it difficult to discriminate between two component frequencies. The cause of this problem is known as pulse crowding, the crowding effect or peak shifting.

By way of background, the magnetic recording surface exhibits a square magnetic hysteresis characteristic and digital information is entered by switching the memory media between its two stable magnetic states. When the magnetic states at the recording surface are detected during playback, the surface is moved relative to the playback head and the flux field variations induce a voltage signal in the playback head. The playback signal is a series of alternating polarity excursions, each of which has a generally Gaussian waveform and occurs at a time determined by the time at which the magnetic state changes on the recording surface.

At low frequencies, the peaks of the playback excursions occur at exactly the same relative positions as the corresponding switching points or crossovers of the input recording current. Hence the switching points of the input recording current are easily reproduced by differentiating the playback signal. However, as the frequency components in the playback signal increase with higher recording densities, the alternating positive and negative excursions overlap so that the algebraic sum of the output excursions introduces a shaft in the peaks of the summed playback voltage. This peak shift is the crowding effect referred to earlier. In addition, a decrease in amplitude occurs in the summed playback waveform as compared to individual excursion peaks.

If the crossovers in the input recording waveform are permitted to shift in playback waveform, the ability to discriminate between the two component frequencies is impaired and could be lost altogether. Although some peak shift distortion can be tolerated, it imposes additional constraints on permissible variations in numerous other parameters of the recording systems. These constraints increase the cost of the memory system, both component costs and production costs, particularly with high-volume production.

Another important consideration with a number of various magnetic memory systems arises because the same transducer is used to write (record) and read (playback). It is normally desirable that the heads be AC coupled to subsequent read amplifier and read demodulator stages. Although these three objectives have at least been appreciated in the prior art, they have usually been approached as separate considerations. AC coupling is obtained by using either capacitors or transformers. Differentiation has been achieved by special circuits in read amplifier stages or separate preamplifier stages. Peak shift distortion has usually been ignored, within limits, at the expense of imposing additional constraints on other recording parameters. Some elaborate techniques, such as delay lines, have been proposed to compensate for peak shifting.

It has been found, and can be shown, that peak shift distortion is the equivalent of eliminating the third and fifth harmonic of the lower component frequency in playback signals. According to the present invention, substantially the same circuit that is sued in the readout circuit to differentiate the playback signal includes components to compensate for the peak shift by deemphasizing the lower component frequency and emphasizing the third and fifth harmonics thereof. In a similar fashion, circuit components that provide DC isolation also form part of the compensation circuit.

Hence the objects of the present invention are to provide a read circuit particularly adapted for a magnetic memory and that overcomes the aforementioned disadvantages; that effectively achieves DC isolation, differentiation of the playback signal and compensation for peak shift distortion; that achieves the aforementioned isolation, differentiation and peak shift compensation by using one or more common components in the circuit to achieve these results; and/or that is simple, low in cost and well suited to high-volume production without imposing severe manufacturing tolerances on other components.

Other objects, features and advantages of the present invention will be apparent in connection with the following description, the appended claims and the accompanying drawings in which:

Figure 1:
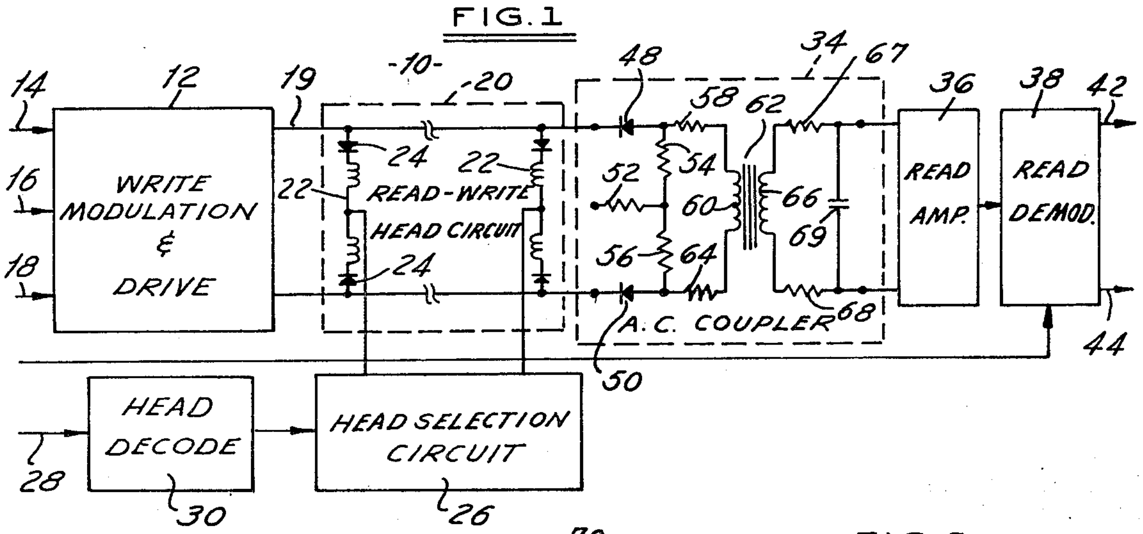
FIG. 1 is a diagram, partly in block form and partly in schematic form, of the circuit for a magnetic memory, including the readout circuit of the present invention.

Referring more particularly to FIG. 1, the read circuit of the present invention is illustrated incorporated in the electronics for a rotating disc magnetic memory storage system 10 for a computer or the like. A write modulation and drive circuit 12 receives input data including the write data at input 14 in binary form, a bit clock at input 16 and a write mode instruction at input 18. Circuit 12 is of conventional construction to convert the binary data at input 14 into a more desirable form for magnetic recording on a rotating disc, a drum or tape (not shown). For purposes of illustrating the best mode, circuit 12 would be a conventional logic circuit responsive to the write data, the bit clock and write mode instructions to modify the binary data for phase modulation recording as will later be described in connection with the waveforms of FIGS. 2–4. The modulated output from circuit 12 is fed via buses 19, 21 to recording heads 22 in a read-write head circuit 20. Although heads 22 are illustrated with two coils each, according to conventional practice each head 22 is a single coil connected across the head buses 19, 21 through two respective steering diodes 24 with a center tap on the coil for head selection purposes. This arrangement may be described as a floating differential connection. Although only two heads have been shown for purposes of simplification, it will also be understood that any number of heads can be included in the head circuit 20 depending on the number of tracks on the recording media. The particular head operative at any given time is set by the head selection circuit 26 in accordance with head address instructions at 28 that are decoded by the head decode circuit 30. Playback signals are also read by the same heads 22 in accordance with head selection instructions from circuit 26. The playback signal is fed through a readout circuit 24 and read amplifiers 36 to the demodulator 38. Demodulator 38 also receives read mode instructions at input 40 to develop binary data at output 42 and clock data at output 44 corresponding to the original data at inputs 14, 16 and 18.

Except for the construction of circuit 34 and the selection of amplifiers 36, the above-described circuit is generally conventional and the operation thereof will be apparent. Upon receipt of a write mode instruction at input 18, circuit 12 provides the modulated data to the head circuit 20 for magnetic recording at a given head 22 selected by instructions from circuit 26. Upon receipt of a read mode instruction at input 40, the binary data and clock data at 42, 44 will be reproduced according to the recorded data read by a given head 22 that is selected by circuit 26.

In accordance with the present invention, the playback signal from head circuit 20 is processed through circuit 34 during the read mode to effectively cause the input at demodulator 38 to be an exact reproduction of the current waveform that wrote the corresponding information at the heads 22. Each of the buses 19, 21 is connected into the circuit 34 through a respective diode 48, 50 that is normally forward biased through a dropping resistor 52 and a voltage divider formed by resistors 54, 56. A resistor 58 connects the juncture of diode 48 and resistor 54 to one end of the primary 60 of a transformer 62. Similarly, a resistor 64 connects the juncture of diode 50 and resistor 56 to the other end of primary 60. The output developed at the secondary winding 66 is applied through resistors 67, 68 across the parallel capacitor 69 and the voltage developed across capacitor 69 is fed to the read amplifier 66. Diodes 48, 50 are normally forward biased for small signals by the bias voltage applied through resistor 52 and serve to disconnect the transformer 62, read amplifier 36 and demodulator 38 from the head circuit 20 during relatively large drive levels at the buses 19, 21 during the write mode. Resistors 54, 56 are selected for maximum signal transfer to the transformer 62 during the read mode. The connection of diodes 48, 50 and resistors 52, 54, 56 also provides differential common mode noise rejection.

As indicated earlier, with phase modulation recording, the playback signal from head circuit 20 will include two frequency components. The higher component is twice the frequency of the lower component. In accordance with one important aspect of the present invention, the mutual inductance of transformer 60 and the value of resistors 58, 64 are selected so that the combined series resistance thereof acts with the inductance of transformer 62 to differentiate the playback signal developed across resistors 54, 56. In the preferred embodiment, the transformer 62 has a powdered ferrite core to provide the desired mutual inductance at the desired operating frequency, although other suitable transformers could be used. Preferably, the combined resistance of resistors 58, 64 is selected to be substantially greater, say at least on the order of at least two or three times greater and preferably on the order of four to 10 times greater, than the inductive reactance of transformer 62 at the higher component frequency to assure sufficient differentiation of both components. The ratio actually used is, in part, dictated by the amount of attenuation that can be tolerated due to the added resistance and the inaccuracy of the differentiation at both $f_o$ and $f_l$ that can be tolerated. Capacitor 69 is selected to tune transformer 2 to parallel resonance at a frequency above the operating frequency, more specifically, in approximately the frequency range of from the third to the fifth harmonic of the lower frequency component.

Figure 2:
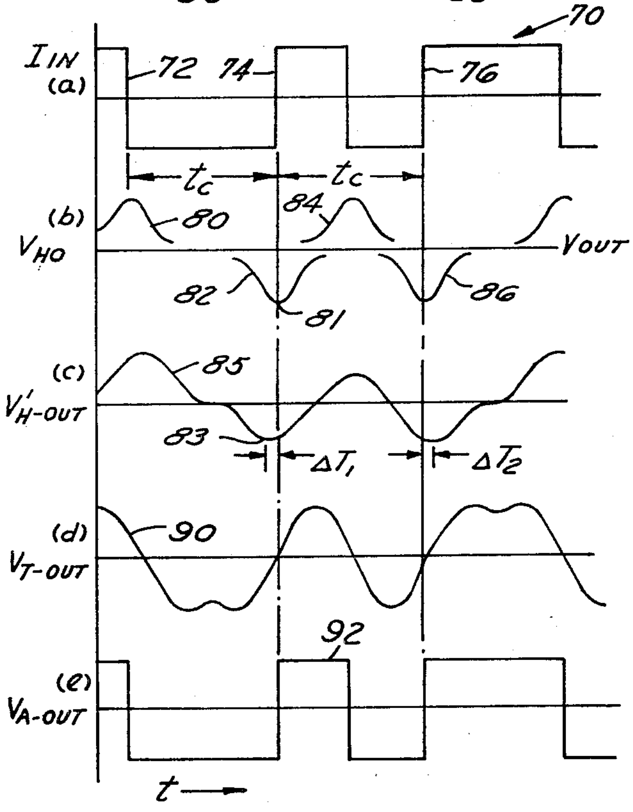
FIG. 2 illustrates waveforms that are applicable to one modulation technique and are useful in understanding the present invention.

Referring to the waveforms illustrated in FIG. 2, FIG. 2*a* shows the modulated input current 70 at buses 19, 21 as a function of time. Although the general waveform of input current 70 could be considered as illustrative for a number of different modulation techniques, it will be described in connection with a phase modulation technique where current reversals at the beginning of a cell time $t_c$ occur only when there is a change in the binary data at 14. More specifically, the current 70 at the edge of cell will have a positive polarity representing a binary "1" in the data at 14 and a negative polarity representing a binary "0." The polarity of current 70 is determined by sampling the binary data at 14 at the center of each bit time as timed by the bit clock. Hence the negative polarity after the first negative going edge-of-cell transition 72 represents a binary "0." The positive polarity after the first positive going edge-of-cell transition 74 indicates a change to a binary "1;" whereas the cell transition 76 indicates that the next digit was a binary "1." This waveform is obtained by gating both the binary data and bit clock into a flip-flop to generate the pulse modulation code. The significant feature of the waveform 70 for purposes of the present invention is that it contains two frequency components, namely, a low-frequency component whose period is twice a cell time $t_c$ as indicated by the negative waveform between the transitions 72, 74 and a double or twice-frequency component whose period is equal to a cell time $t_c$ as illustrated by the waveform between the transitions 74, 76. This double frequency characteristic is also present in the other modulation techniques described hereinabove and, in addition, similar recording techniques may produce a higher frequency multiple.

When the current waveform 70 is used to record on square hysteresis characteristic media, during the read mode a change in flux density at the surface of the media will generate an alternating series of positive and negative voltage excursions in heads 22. These excursions have the generally Gaussian shape shown in FIG. 2*b* ($V_{HO}$). It will be understood, of course, that readout waveforms of FIG. 2*b–e* do not occur in time coincidence with the write current 70 (FIG. 2*a*). The waveforms of FIGS. 2*b–e* show relative phase or position as a function of time. The edge-of-cell transition at 72 generates the first positive excursion 80 which is offset substantially from the first negative excursion 82 generated by the transition 74. In this low-frequency component ($f_o$) excursions 80, 82 would not distort each other when they are summed during the read mode as illustrated by the summed head output waveform 85 ($V'_{H\text{-}OUT}$) in FIG. 2*c*. However, the leading portion of the second positive excursion 84 would overlap the trailing portion of the negative excursion 82 and hence the algebraic summation in waveform 85 at the higher frequency component ($f_l$) produces a shift $T_l$ in the peak 83 of the waveform 85 toward the left as viewed in FIG. 2*c* from the corresponding negative peak 81 of excursion 82. Similarly, the trailing portion of excursion 84 when summed algebraically with the leading portion of the negative excursion 86 would cause an apparent shift $T_2$, toward the right as viewed in FIG. 2*c*, of the peak in waveform 85 from the corresponding negative peak of excursion 86. Waveform 85 is not actually produced in the circuit of FIG. 1 because of the compensation provided by circuit 34. However, FIG. 2*c* does illustrate the crowding effect that would be present without circuit 34. The peak or phase shift becomes quite pronounced at high-recording densities. A Fourier analysis shows that the waveform 85 lacks the higher order harmonics of the lower frequency component in the input current 70, principally the third and fifth harmonics of the lower frequency $f_o$. With a conventional detection technique, the summation waveform 85 is differentiated and the zero crossings of the differentiated signal are used to reconstruct the original current input waveform 70. If the zero crossings are permitted to vary due to the crowding effect described hereinabove, the subsequent detection circuits will be less able to discriminate between the two frequency components, $f_o$ and $f_1$.

According to the present invention, the parameters of transformer 62, resistors 58, 64 and capacitor 69 are selected to differentiate the excursions 80, 82, 84, 86 and the value of capacitor 69 selected to emphasize the higher order harmonics of the low-frequency component ($f_o$). With this arrangement, the transformer output 90 ($V_{T\text{-}OUT}$) taken across capacitor 69 and fed to amplifier 36 will have its zero crossings accurately phased relative to the switching points in the input current 70. Amplifiers 36 are high gain, Class A amplifiers that are driven into saturation at the crossovers of the voltage waveform 90 to provide an accurate reproduction 92 of the input current waveform 70 for detection at demodulator 38.

Figure 3:
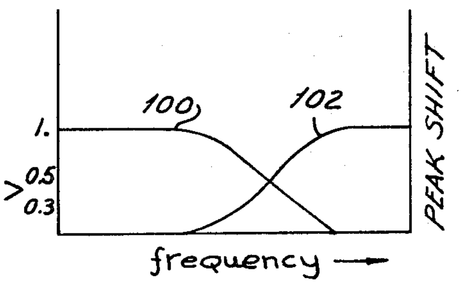
FIG. 3 is a plot illustrating the playback signal response with frequency.
Figure 4:
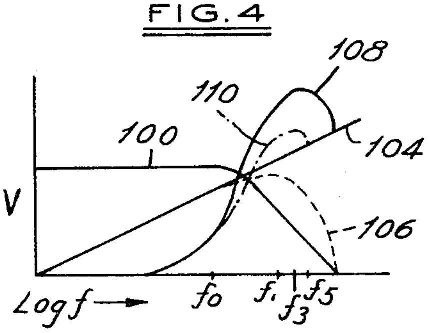
FIG. 4 is a plot illustrating the compensation achieved by the present invention.

The present invention will be more apparent from the functions plotted in FIGS. 3 and 4 and a brief reference to the equivalent circuit of transformer 62. FIG. 3 illustrates the crowding effect for typical read-write head characteristics plotted as a function of frequency. The summed head-output voltage (normalized), corresponding to $V'_{H\text{-}OUT}$, is shown by curve 100 and the peak shift (as a percentage of frequency) is shown by curve 102. A drop in the head output voltage from 1.0 to 0.5 is accompanied by a 6 percent peak shift. A further decrease to 0.3 percent is accompanied by a 12 percent peak shift. Although the slopes of the curves 100, 102 in FIG. 3 vary somewhat, the general shape applies to most magnetic recording devices and the slopes shown are typical. FIG. 3 shows that as long as the circuit is operating on the level frequency response portion of curve 100, there is no accompanying peak shift. At a frequency beyond the knee of the voltage curve 100, a corresponding peak shift is encountered. To achieve high-recording densities, it is often necessary to operate beyond the knee of curve 100. With the present invention, the frequency response of curve 100 is modified at the higher frequencies to minimize peak shift distortion that would otherwise appear at frequencies above the knee of the curve 100 as shown in FIG. 4.

Before examining FIG. 4, it is noted that the equivalent circuit for the transformer 62 (looking from resistors 58, 64) can be viewed as a lumped leakage inductance in series with the parallel combination of the lumped interwinding capacitance and the lumped mutual inductance. In the preferred embodiment, the transformer is selected so that the mutual inductance is much greater than the leakage inductance so that the signal coupled to the secondary 66 is not attenuated by the leakage inductance. With powdered ferrite core transformers, a mutual inductance at least 100 times greater than the leakage inductance can be obtained. The interwinding capacity of the transformer is also selected to be small so that its reactance is small relative to the mutual inductance reactance at the operating frequency. For example, one transformer used with the present invention, where $f_o$ was 0.5 MHz. and $f_t$ was 1 MHz., had a 1 to 1 turns ratio, a mutual inductance of 15 microhenries, a leakage inductance of 0.3 microhenries and an interwinding capacitance of 13 picofarads. For this transformer, resistors 58, 64 were each 200 ohms providing a total series resistance of 400 ohms. Resistors 54, 56 were each 510 ohms. With these values, the higher frequency component $f_t$ and hence also the lower frequency component $f_o$ will be sufficiently differentiated. The inductance of transformer 62 will provide some phase shift compensation since the inductance increases linearly with frequency at a slope of 6 db. per octave as illustrated by plot 104 in FIG. 5. Hence the multiplication product of the curves 100, 104 will provide a frequency response characteristic illustrated at 106 that emphasizes the higher frequency components, principally the third and fifth harmonics of the lower frequency $f_o$. However, by properly selecting the value of capacitor 69, the secondary 69 can be tuned to parallel resonance at a frequency substantially greater than the higher frequency component $f_t$ as illustrated by the resonance curve 108. In the preferred embodiment, transformer 62 is tuned to resonance in the frequency range of approximately from the third harmonic $f_3$ to the fifth harmonic $f_5$ of the lower frequency component $f_o$. It will be seen that the resulting multiplication product of the resonance characteristic 108 with the voltage waveform 100 provides the frequency response illustrated by curve 110. By operating on curve 110, the necessary emphasis of the third and fifth harmonics $f_3$, $f_5$ is obtained. Some emphasis will be achieved so long as the frequency range from the low-frequency component $f_o$ to the third harmonic $f_3$ lies on the leading portion (positive slope) parallel resonance curve 108. The parallel resonance characteristic offers a further advantage in that a substantial voltage gain can be obtained at or near resonance. Proper selection of the "Q" of the circuit and tuning in or near the frequency range of from the third harmonic to the fifth harmonic can provide a substantial emphasis on the third and fifth harmonics while deemphasizing the lower frequency component $f_o$. For the circuit values previously set forth, capacitor 69 had a value of 680 picofarads in one embodiment. Capacitor 69 can also be replaced by a capacitor across primary 60 and indeed this modification may be required for transformers having a turns ratio greater than 1 to 1. It will be understood that FIG. 4 is intended to illustrate the principles involved rather than the accurate response characteristics of the circuit described.

Although the readout circuit has been described hereinabove for general cases of phase modulation, the technique can be directly applied to recording using pulse phase modulation, frequency modulation, other double frequency techniques and similar multiple frequency techniques. A substantial advantage is realized because transformer 62 provides DC isolation and also serves as one of the passive components in the differentiator formed with resistors 58, 64. Even without capacitor 69, the inductive effect of transformer 62 as illustrated by the gain characteristic 104 will provide some peak shift compensation. However, a significant improvement in peak or phase shift compensation is obtained by merely adding the parallel capacitor 69 which, when tuned to resonance, provides very satisfactory peak shift compensation.

The particular readout circuit for digital magnetic recording system has been described hereinabove for purposes of illustration and is not intended to indicate limits of the present invention, the scope of which is defined by the following claims.

I claim:

1. In a digital recording apparatus wherein digital data is modulated to provide an input signal for recording on magnetic storage media at a predetermined density and wherein recorded data is read by a magnetic transducer to provide a playback signal which when demodulated reproduces said digital data, a readout circuit coupling said playback signal to a demodulator for reducing peak shift distortion comprising a pair of input terminals coupled to said transducer, a pair of output terminals coupled to said demodulator, first circuit means operatively coupled between said input terminals and said output terminals to decouple said output terminals from said input terminals at zero frequency, second circuit means coupled between said input terminals and said output terminals to differentiate at least a first component of said playback signal having a first predetermined frequency correlated to said recording density and third circuit means coupled between said input terminals and said output terminals and having a predetermined frequency response so as to deemphasize a component of said playback signal having a second predetermined frequency on the order of one-half said first predetermined frequency and emphasize at least a component of said playback signal that is either the third or fifth harmonic of said second predetermined frequency.

2. The apparatus set forth in claim 1 wherein said first circuit means and said second circuit means include at least a first common passive circuit component.

3. The apparatus set forth in claim 2 wherein said first common component is a transformer having a predetermined inductive impedance at said first predetermined frequency, and wherein said second circuit means further comprises resistive impedance means in series with the primary winding of said transformer and said resistive impedance means has a value substantially greater than said inductive impedance of said transformer at said first predetermined frequency.

4. The apparatus set forth in claim 3 wherein said transformer has a mutual inductance that is substantially greater than the leakage inductance of said transformer.

5. The apparatus set forth in claim 4 wherein said resistive impedance is at least on the order of approximately two times as great as said inductive impedance at said first predetermined frequency.

6. The apparatus set forth in claim 5 wherein said transformer has a powdered ferrite core.

7. The apparatus set forth in claim 5 wherein said transformer also includes a secondary winding, said third circuit means includes capacitive impedance means coupled in parallel with one of said windings and wherein said capacitive impedance means has a value so as to tune said transformer to parallel resonance at a frequency of said harmonic.

8. The apparatus set forth in claim 7 wherein said capacitive impedance means comprises a capacitor connected in parallel with said secondary winding of said transformer.

9. The apparatus set forth in claim 8 wherein said capacitor exhibits a capacitive impedance at said first predetermined frequency that is in the approximate range of from four to 10 times said inductive impedance of said transformer at said first predetermined frequency.

10. The apparatus set forth in claim 3 wherein said resistive impedance has a value on the order of at least two times as great as said inductive impedance of said transformer at said first predetermined frequency.

11. The apparatus set forth in claim 3 wherein said third circuit means comprises capacitive impedance means coupled in parallel with a winding of said transformer and having a value so as to tune said transformer to parallel resonance at a frequency substantially greater than said predetermined frequency.

12. A readout circuit for use with digital recording apparatus wherein digital data is modulated to provide an input signal for recording on magnetic storage media at a predetermined density and wherein recorded data is read by a magnetic transducer to provide a playback signal which when demodulated reproduces said digital data, said playback signal having at least a first component of a first predetermined frequency and second component of a second predetermined frequency on the order of one-half said first predetermined frequency and second component of a second predetermined frequency on the order of one-half said first predetermined frequency, said readout circuit comprising a pair of input terminals adapted to receive said playback signal, a transformer having a primary and a secondary winding, resistive impedance means connected in series with said primary winding across said input terminals, said resistive impedance means having a value greater than the inductive impedance of said transformer at said first frequency so as to differentiate said first component and other components at frequencies below said first predetermined frequency, and a capacitor connected in parallel with one of said windings of said transformer and having a value that tunes said transformer and said capacitor to parallel resonance tuned at a third frequency substantially greater than said first predetermined frequency so as to emphasize still further components of said playback signal at said third frequency and deemphasize said second components.

13. The readout circuit set forth in claim 12 wherein said resistive impedance means has a value on the order of at least two times as great as the inductive impedance of said first transformer at said predetermined frequency.

14. The playback circuit set forth in claim 13 wherein said transformer has a mutual inductance that is at least 10 times as great as its leakage inductance and said resistive impedance is approximately in the range of from four to 10 times said inductive impedance at said first predetermined frequency.

15. The playback circuit set forth in claim 14 wherein said capacitor has a capacitive impedance at said predetermined frequency on the order of two times the mutual inductance of said transformer at said first predetermined frequency.

* * * * *

PO-1050
(5/69)

UNITED STATES PATENT OFFICE
CERTIFICATE OF CORRECTION

Patent No. 3,631,420 Dated December 28, 1971

Inventor(s) Gerald K. Strehl

It is certified that error appears in the above-identified patent and that said Letters Patent are hereby corrected as shown below:

In column 1, line 9, after "desirable" delete "handwidth" and insert in place thereof --bandwidth--; line 33, after "introduces a" delete "shaft" and insert in place thereof --shift--; line 65, after "that is" delete "sued" and insert in place thereof --used--.

In column 2, line 52, after "circuit" delete "24" and insert --34--.

In column 3, line 39, after "transformer" delete "2" and insert in place thereof --62--; line 60, after "whereas the" insert --negative polarity after the second positive going edge-of- --.

In column 8, line 12 (claim 13), after "impedance of said" delete "first"; line 13 (claim 13), before "predetermined" insert --first--; line 21 (claim 15), after "inductance" insert --impedance--.

Signed and sealed this 15th day of August 1972.

(SEAL)
Attest:

EDWARD M.FLETCHER,JR.
Attesting Officer

ROBERT GOTTSCHALK
Commissioner of Patents